(12) United States Patent
Shah et al.

(10) Patent No.: US 7,719,959 B2
(45) Date of Patent: May 18, 2010

(54) ACHIEVING SUPER-FAST CONVERGENCE OF DOWNSTREAM MULTICAST TRAFFIC WHEN FORWARDING CONNECTIVITY CHANGES BETWEEN ACCESS AND DISTRIBUTION SWITCHES

(75) Inventors: Vipul Shah, Cupertino, CA (US); Gnanaprakasam Pandian, Cupertino, CA (US); Vamsi Mohan Kodavanty, Fremont, CA (US); Arun Sastry, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 304 days.

(21) Appl. No.: 11/738,435

(22) Filed: Apr. 20, 2007

(65) Prior Publication Data
US 2008/0259913 A1    Oct. 23, 2008

(51) Int. Cl.
*G06F 11/07* (2006.01)
(52) U.S. Cl. ............... 370/220; 370/219; 370/386; 370/221; 370/225
(58) Field of Classification Search ............ 370/389, 370/588, 390, 219, 222, 217, 401, 469, 432, 370/395.32, 220, 221, 386; 709/238
See application file for complete search history.

(56) References Cited

U.S. PATENT DOCUMENTS

| | | | | |
|---|---|---|---|---|
| 6,654,371 | B1 * | 11/2003 | Dunstan et al. | 370/390 |
| 7,209,435 | B1 * | 4/2007 | Kuo et al. | 370/219 |
| 7,512,146 | B1 * | 3/2009 | Sivasankaran et al. | 370/432 |
| 2002/0120769 | A1 * | 8/2002 | Ammitzboell | 709/238 |
| 2005/0276215 | A1 * | 12/2005 | Kitani et al. | 370/217 |
| 2008/0001765 | A1 * | 1/2008 | Nguyen et al. | 340/588 |

OTHER PUBLICATIONS

Cisco Systems, Inc., Configuring Flex Links, Catalyst 3560 Switch Software Configuration Guide 78-16404-01, Chapter 19, available on the Internet at: <http://www.cisco.com/univercd/cc/td/doc/product/lan/cat3560/12220se/3560scg/swflink.pdf>.

* cited by examiner

*Primary Examiner*—Hong Cho
*Assistant Examiner*—Yosief Berhane
(74) *Attorney, Agent, or Firm*—Charles E. Krueger

(57) ABSTRACT

In one embodiment a switch has active and standby LAYER 2 switch interfaces coupled, respectively, to device interfaces of first and second LAYER 2/LAYER 3 network devices. The active switch interface is configured to forward all egress traffic and accept all ingress traffic and the standby switch interface is configured to forward only IGMP messages and configured to block all ingress traffic.

10 Claims, 5 Drawing Sheets

ACHIEVING SUPER-FAST CONVERGENCE OF DOWNSTREAM MULTICAST TRAFFIC WHEN FORWARDING CONNECTIVITY CHANGES BETWEEN ACCESS AND DISTRIBUTION SWITCHES

BACKGROUND OF THE INVENTION

As the number of Internet users and Internet-based mission-critical applications increase daily at an unprecedented pace, service-provider and enterprise customers are demanding greater reliability and availability. When every minute of downtime can mean millions of dollars in lost revenue and embarrassing headlines, companies are eagerly looking for solutions to make their systems highly available.

One technique for increasing reliability and availability is redundancy, where active and standby resources are provided along with techniques to switch to the standby resource when the active resource fails.

On such technique, developed by the assignee of the present application, is to backup the active interface, or port, on a switch with a standby interface. In the following this technique will be referred to as "flexlink". Flexlink allows users to configure a first Layer 2 interface of a switch to backup another Layer 2 interface of the switch. For a given set of virtual local area networks (VLANs), at any given time only one flexlink interface is in forwarding state (referred to as "active" link in the following) while the other link does not allow the traffic to pass through (referred to as "standby" link). Flexlink is generally used at the edge between access and distribution switches/routers. These distribution switches/routers include both Layer 2 (or data link layer) interfaces which use Media Access Control (MAC) addresses and Layer 3 (network layer) interfaces which use network (IP) addresses and will be referred to in the following as LAYER 2/LAYER 3 network devices.

The idea behind flexlink is that if one of the uplink fails, the edge switch still remains connected to the core network through the other uplink. With the flexlink configuration, only one of the uplinks is forwarding data at any given time and hence data forwarding loops are avoided.

TECHNICAL FIELD

The present disclosure relates generally to techniques for achieving fast multicast convergence when an active LAYER 2 link fails and is replaced by a standby LAYER 2 link.

DESCRIPTION OF EXAMPLE EMBODIMENTS

Overview

Figure 1:
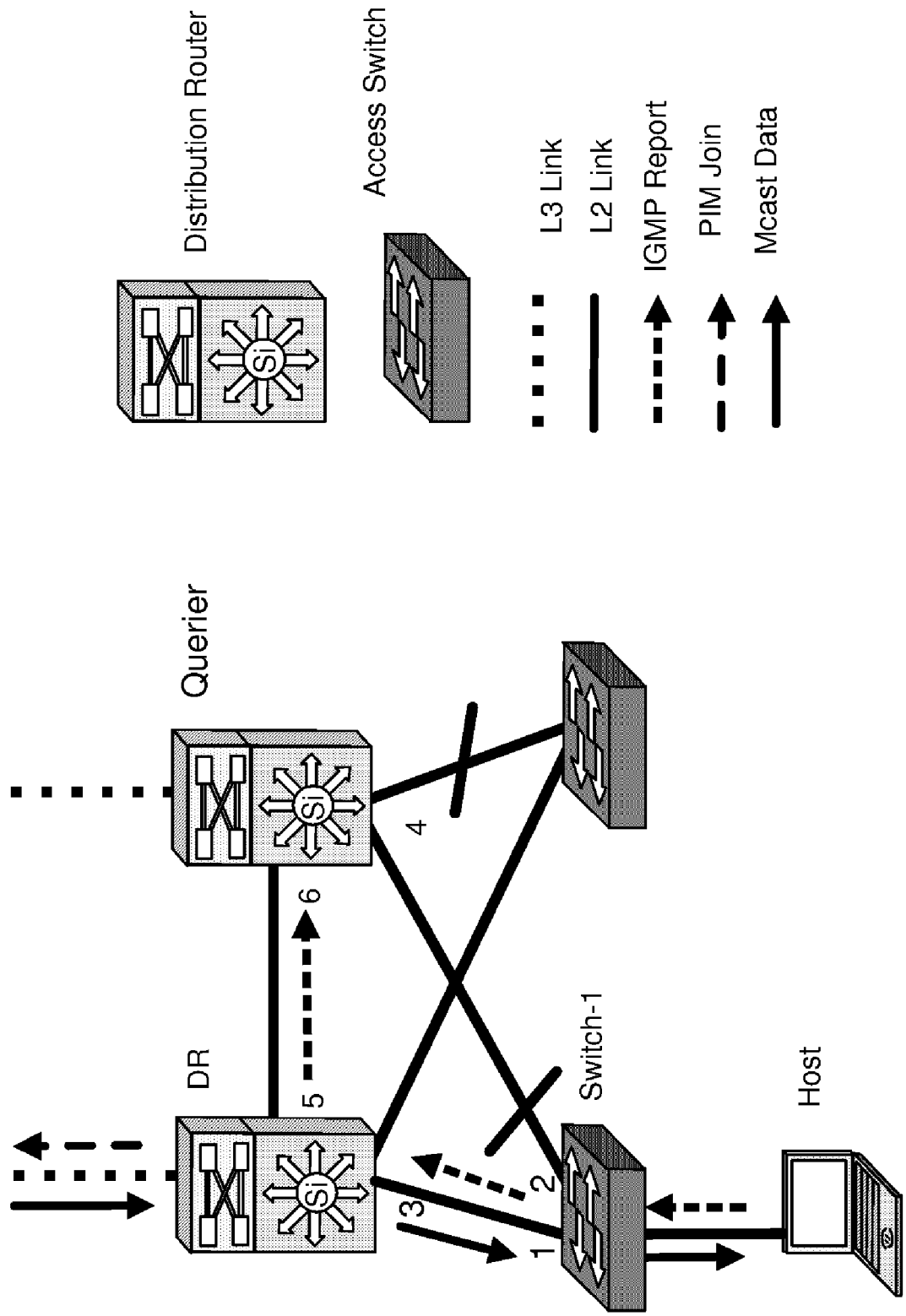
FIG. 1 illustrates an example of a flexlink topology.

Example embodiments utilizing active and standby Layer 2 ports are configured so that the standby port "leaks" IGMP information to enable building of multicast tables at a designated router for the standby interface and multicast traffic is transmitted to the standby interface. The standby interface is configured to drop all received multicast traffic unless the active interface fails, at which time the standby interface will become active and will immediately have access to the multicast traffic already being transmitted to it.

Description

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

In the case when a flexlink active link goes down and the standby link comes up, currently there is a black holing of multicast traffic for some duration. This delay is caused by the convergence time required to build a new multicast tree on the port of a designated router that serves the newly activated standby link. Convergence time starts when the standby link becomes active and ends when all the multicast data has been entered into the multicast tree for the newly active link.

Much of the specification for IP Multicasting is defined in the Internet Group Management Protocol (IGMP) in the Internet Task Force Request for Comments (IETF RFC) 1112 which is available on the sis.ohio-state.edu website with the extension /htbin/rfc/rfc112.html.

The Internet Group Management Protocol (IGMP) is used to dynamically register individual hosts in a multicast group on a particular VLAN. IGMP v. 2 utilizes membership query, membership report, and leave group messages.

Hosts send out a "join" which consists of sending IGMP membership reports corresponding to a particular multicast group to indicate that they are interested in joining that group. The Layer 3 device periodically sends out an IGMP/Multicast Listener Discovery (MLD) membership query to verify that at least one host on the subnet is still interested in receiving traffic directed to that group.

The hosts send out a "leave" by using the leave group message to actively communicate to the local multicast Layer 3 device their intention to leave the group. The Layer 3 device then sends out a group-specific query and determines whether there are any remaining hosts interested in receiving the traffic.

As described above, there is a possible multicast traffic black holing after flexlink active link failure. A description of the flow of multicast traffic in a typical flexlink deployment will now be described with reference to FIG. 1. FIG. 1 depicts a topology where an access switch Switch-1 is connected to two distribution switches via a flexlink. The link 1-3 is an active link having active interface(1) which forwards the traffic and the link 2-4 is a standby link having an inactive interface(2).

If there are multiple routers present in a given Layer 2 segment, only one router with the higher IP address is elected as the DR (Designated Router). Only the DR in the subnet forwards Protocol Independent Multicast (PIM)-join messages towards upstream routers. Similarly only one router with the lowest IP address wins the Querier election. Only the elected Querier generates IGMP/(MLD) queries for the subnet.

The IGMP reports from the host are forwarded towards all the routers in the subnet and hence are forwarded on links 1-3 and 5-6. Even though both of the distribution routers receive IGMP reports, only the DR in the subnet maintains a multicast tree including group membership records and generates PIM Join messages. This multicast tree is maintained only for the specific interface, or port, that is receiving the IGMP join messages. In this example, the multicast tree is maintained only for interface(3) on the DR. On receiving multicast data traffic from upstream, the DR forwards it over link 3-1 based on group membership records included in the multicast tree.

Figure 2:
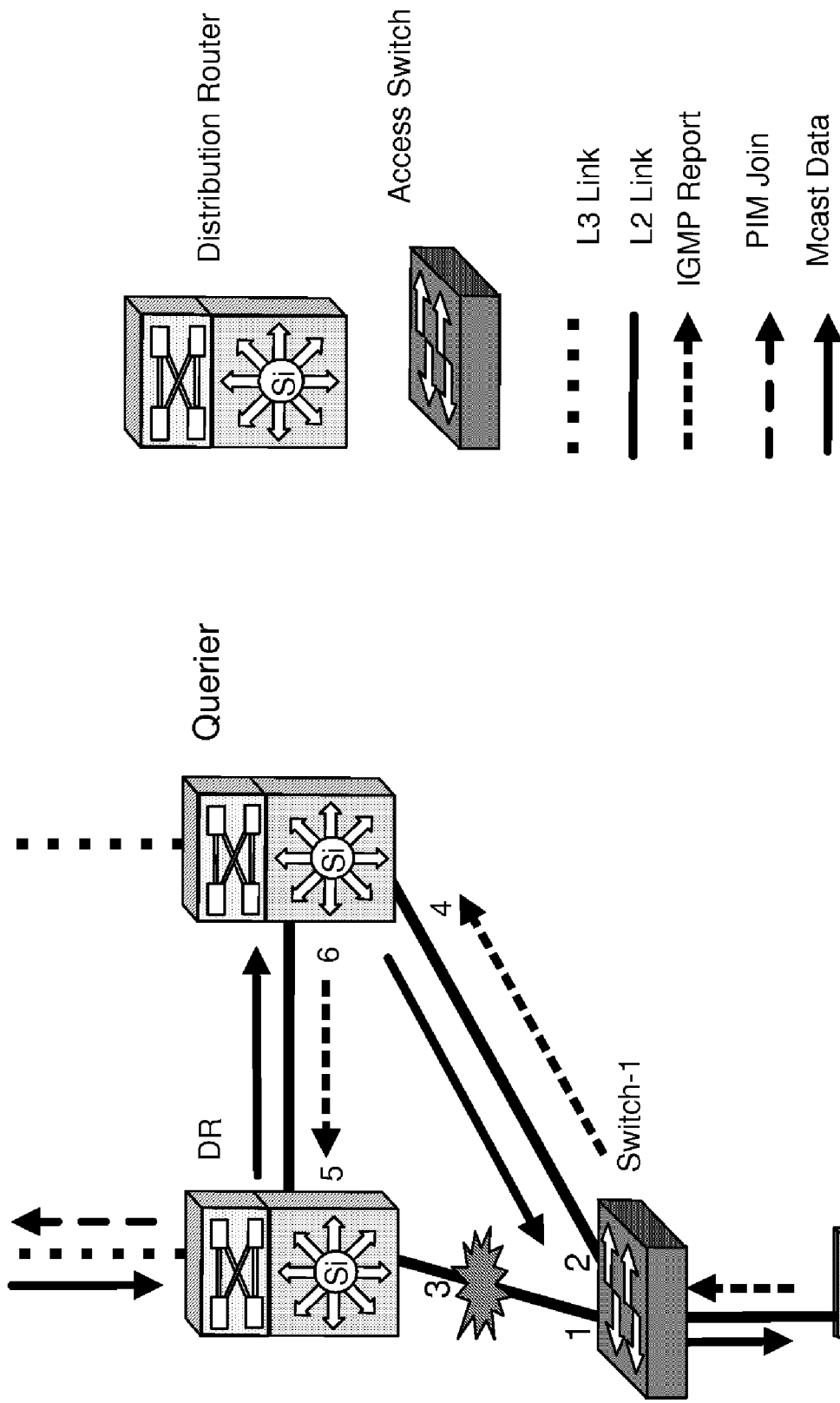
FIG. 2 illustrates an example of the topology after the failure of a link.

FIG. 2 depicts the topology after the failure of the active link 1-3. When the flexlink active interface goes down, the multicast traffic flow is affected because the multicast tree including the group membership record is maintained at the DR for only the active interface, in this example interface(3) of the DR, which went down. The multicast traffic flow will resume only when the next report is received on the standby interface 2-4 (which just became active) and when these reports are processed by both the distribution routers. FIG. 2 also shows the path of the converged multicast traffic after flexlink active link failure.

Note that even after convergence, the multicast traffic will still flow through DR and hence the convergence is local between the access switch and distribution switches. There is no group membership change or multicast convergence required on upstream routers on the failure of flexlink. Also the IGMP reports from hosts are not triggered until the next Query message is received.

Typically the Query message is generated every 60 seconds by default and with max-response-time in the Query configured to 10 seconds by default. So in the worst case it may take up to 60 to 70 seconds before the multicast traffic resumes after flexlink active link failure.

An embodiment of a technique for achieving a multicast convergence on the order of sub-seconds will now be described with reference to the topology depicted in FIG. 3 and the flow chart of FIG. 4.

In this embodiment, a redundant path for multicast traffic is already set up even before the flexlink active link goes down. This is achieved by leaking only IGMP report packets on the flexlink standby link (link 2-4). These leaked IGMP report messages are processed by the upstream distribution routers, so multicast data traffic gets forwarded on the standby interface, in this example interface(5) of the DR, as well. In this embodiment, all the incoming traffic on the standby interface is dropped at the standby interface(2) of the access switch so that no duplicate multicast traffic will be received by the host.

The embodiment will now be described in more detail with reference to the flow chart of FIG. 4. Normally, all egress traffic on the flexlink standby interface is dropped by the output PACL. In this embodiment, the Port Access Control List (PACL) is modified to allow only IGMP Report/Leave messages to be forwarded on link 2-4; all other traffic is blocked as in the normal case.

Another technique for leaking IGMP report messages is to block the standby interface, in this example interface(2) of Switch-1, by setting a hardware blockForward bit to cause the interface to drop all egress traffic. Software then sets a blockForwardOverride bit in each packet including IGMP report message data to override blockForward setting of the port to allow IGMP report messages to be forwarded.

In this embodiment, the DR receives IGMP messages on interface(5), constructs a multicast tree for interface(5) and forwards multicast traffic on link 5-6 which is then forwarded by the QuerierRouter on link 4-2. All ingress traffic is dropped at interface(2) of Switch-1 when the interface is not active.

When the flexlink active link fails, the access switch will be reconfigured to start accepting traffic from the standby link as shown in FIG. 2. The multicast traffic will immediately converge since the traffic is already pulled by the other distribution router. There will be negligible traffic disruption due to the time required to detect active flexlink failure and to program the flexlink standby link to accept all the traffic.

In general, the flexlink may be programmed to carry traffic on both links, with each link being partially active and partially inactive. For example, if there were 20 VLANs in the subnet, link 1-3 could be programmed to carry VLAN(1) through VLAN(10), the first set of VLANs, and link 2-4 could be programmed to carry VLAN(11) through VLAN(20), the second set of VLANs. Both links must have redundant bandwidth so that each link can carry traffic for all 20 VLANs in the event that one of the links fails.

The technique for super-fast multicast traffic convergence is similar to that described above with reference to FIGS. 3 and 4. In this case, as depicted in the flow chart of FIG. 5, IGMP messages for VLAN(L1) through VLAN(20) are leaked on link 1-3, a multicast tree for those VLANs is built for interface (3) on the DR, multicast traffic for VLAN(11) through VLAN(20) is forwarded on link 3-1, and dropped on interface(1) of Switch-1. Similarly, IGMP messages for VLAN(1) through VLAN(10) are leaked on link 2-4, a multicast tree for those VLANs is built for interface (5) on the DR, multicast traffic for VLAN(1) through VLAN(10) is forwarded over links 5-6 and 4-2, and dropped on interface(2) of Switch-1.

In the event that one of the links fails, e.g., link 1-3, then the other link, e.g., link 2-4, is activated to receive the traffic for the VLANs that were previously active on link 1-3 and inactive on link 2-4, e.g., VLAN(1) through VLAN(10). The multicast traffic for those VLANs is already being pulled and there is minimal delay in the convergence of Multicast traffic for VLAN(1) through VLAN(10) over link 2-4.

Figure 3:
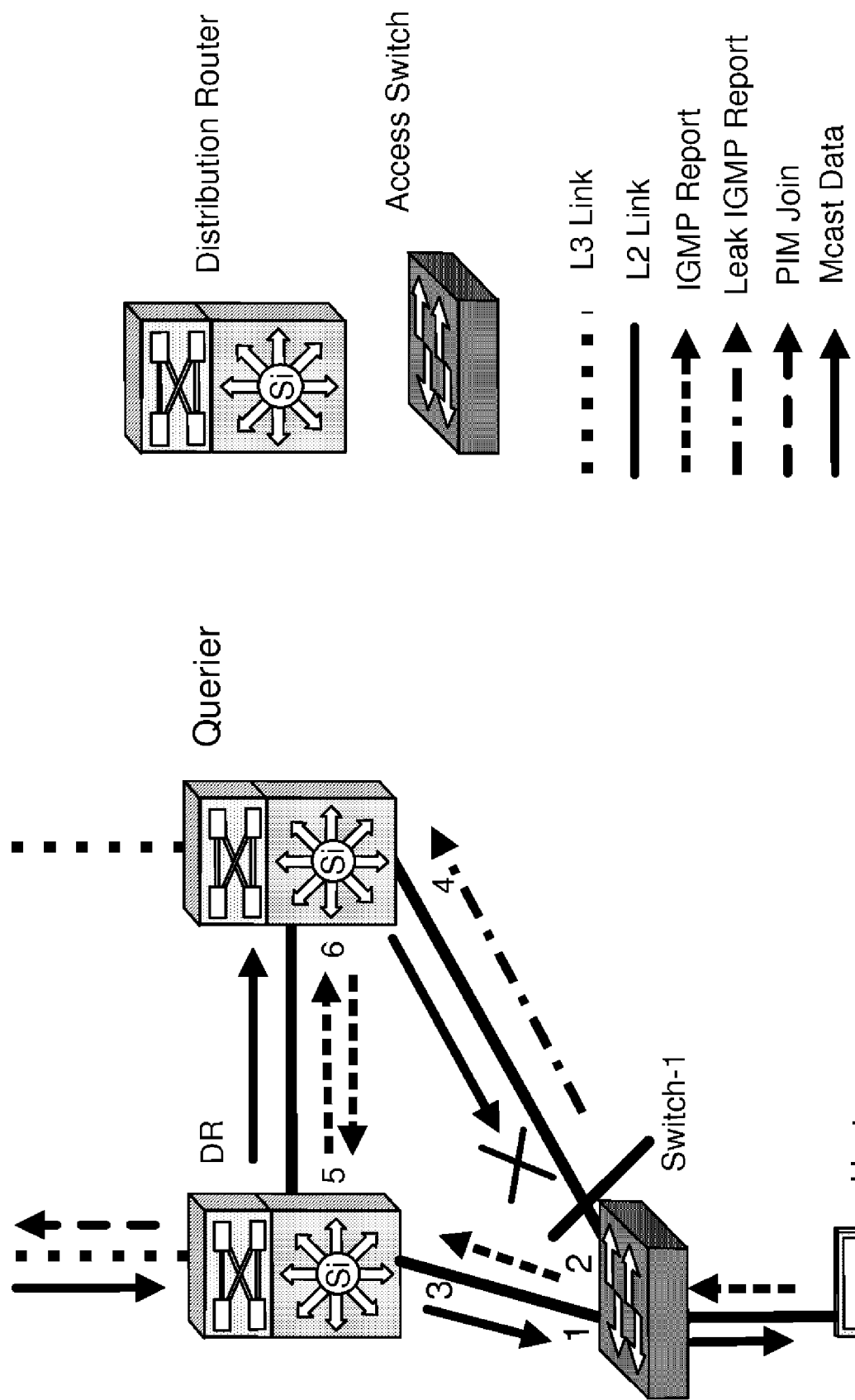
FIG. 3 illustrates an example of multicast convergence over the topology.
Figure 4:
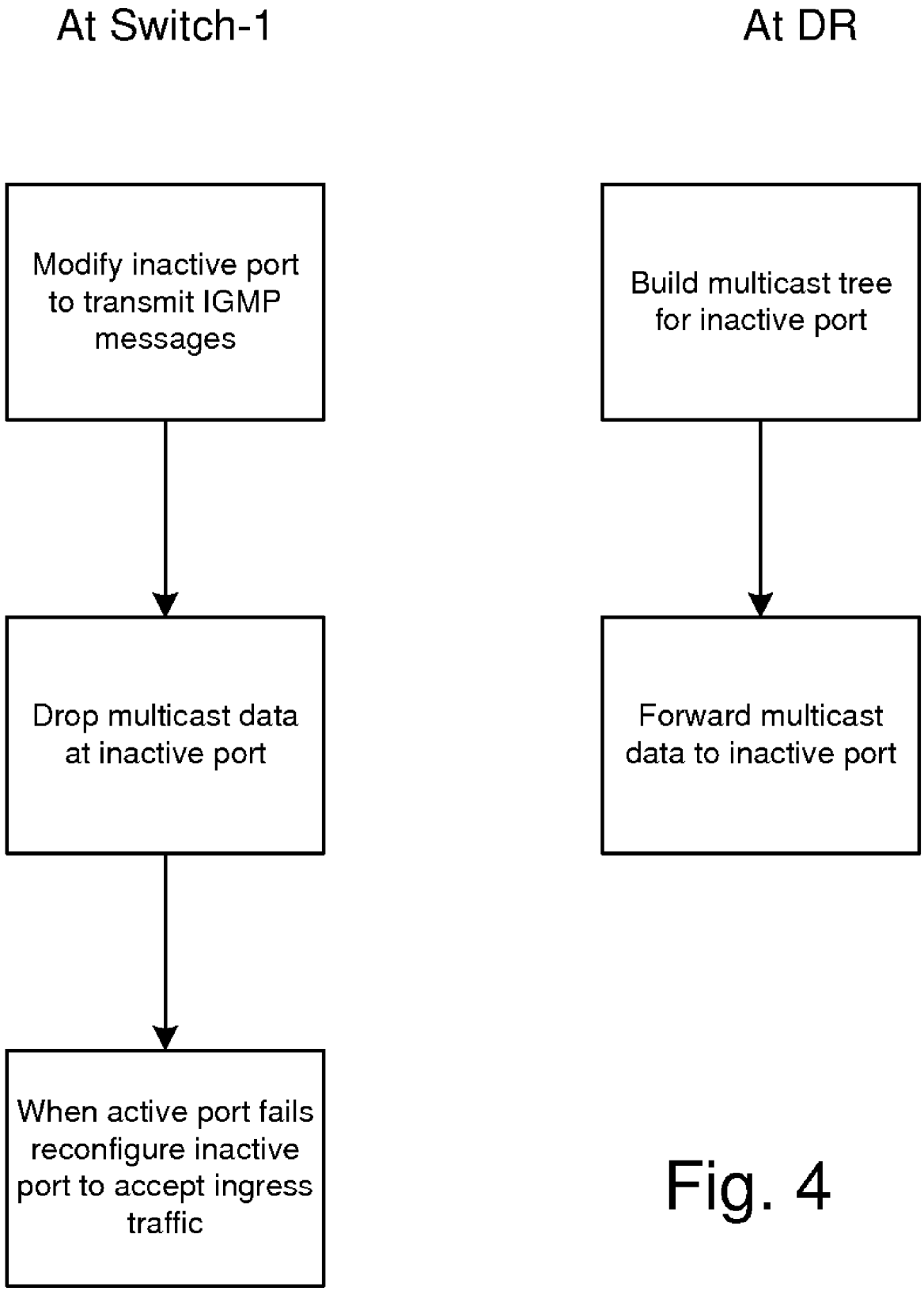
FIG. 4 is a flow chart illustrating an example of multicast convergence.
Figure 5:
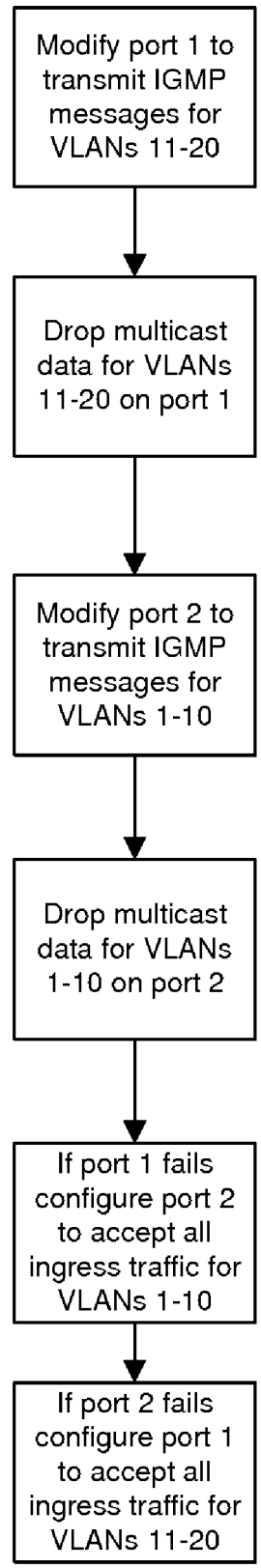
FIG. 5 is a flow chart illustrating an example of multicast convergence for first and second sets of VLANs having active and standby ports.
Figure 5:
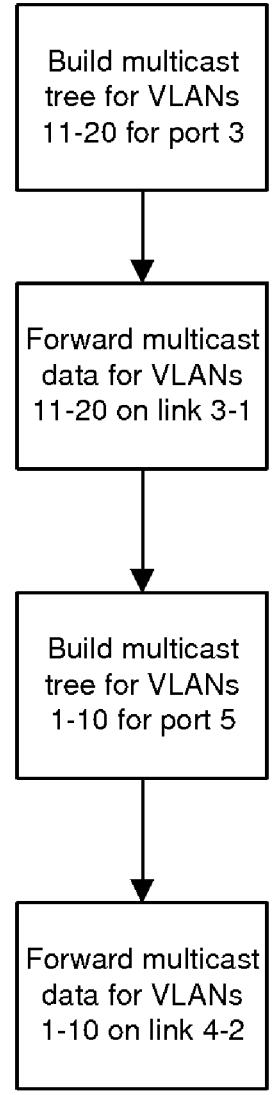

Thus, FIGS. 3 and 4 depict the case where there are no VLANs in the second set of VLANs.

Since the flexlink paradigm requires that each link of the redundant pair be capable of carrying traffic for all the VLANs, there is abundant unused bandwidth on each link to carry the leaked IGMP messages for the inactive VLANs and the Multicast traffic directed to the inactive VLANs which is dropped at the interface.

The invention has now been described with reference to the preferred embodiments. Alternatives and substitutions will now be apparent to persons of skill in the art. For example, the above described embodiments refer to the flexlink system, however, the invention has utility in other redundancy techniques utilizing active and standby ports on an LAYER 2 switch. Accordingly, it is not intended to limit the invention except as provided by the appended claims.

What is claimed is:

1. A method comprising:
   forwarding all traffic received from hosts on a first set of VLANs and accepting all traffic destined to hosts on the first set of VLANs at a first layer 2 switch interface of a switch when a first link is up, with the first layer 2 switch interface coupled to a first layer 2 device interface of a first layer 2 and layer 3 network device by the first link;
   forwarding all traffic received from hosts on a second set of VLANs and accepting all traffic destined to hosts on the second set of VLANs at a second layer 2 switch interface on the switch when a second link is up, with the second layer 2 switch interface coupled to a first layer 2 device interface of a second layer 2 and layer 3 network device by the second link, where the first layer 2 switch interface is a backup of the second layer 2 switch interface and the second layer 2 switch interface is a backup of the first layer 2 switch interface;

forwarding only Internet Group Management Protocol (IGMP) messages received from hosts on the first set of VLANs and blocking all traffic destined to hosts on the first set of VLANs at the second layer 2 switch interface on the switch when the first link is up;

forwarding only IGMP messages received from hosts on the second set of VLANs and blocking all traffic destined to hosts on the second set of VLANs at the first layer 2 switch interface of the switch when the second link is up; and enabling the second layer 2 switch interface to forward all traffic received from and accept all traffic destined to the first and second groups of VLANs only if the first link fails.

2. The method of claim 1 further comprising: maintaining a multicast tree at the first layer 2 and layer 3 network device for the first layer 2 device interface indicating the identities of hosts on the first and second sets of VLANs that are to receive multicast data and forwarding multicast data for hosts in the first and second sets of VLANs over the first link, where a second layer 2 device interface of the first layer 2 and layer 3 device is coupled to a second layer 2 device interface of the second layer 2 and layer 3 device by a third link; and maintaining a multicast tree at the first layer 2 and layer 3 device for its second layer 2 interface indicating the identities of hosts on the first and second sets of VLANs that are to receive multicast data and forwarding multicast data for hosts on the first and second sets of VLANs over the second and third links to the second layer 2 switch interface.

3. An apparatus comprising:
means for forwarding all traffic received from hosts on a first set of VLANs and accepting all traffic destined to hosts on the first set of VLANs at a first layer 2 switch interface of a switch when a first link is up, with the first layer 2 switch interface coupled to a first layer 2 device interface of a first layer 2 and layer 3 network device by the first link;

means for forwarding all traffic received from hosts on a second set of VLANs and accepting all traffic destined to hosts on the second set of VLANs at a second layer 2 switch interface on the switch when a second link is up, with the second layer 2 switch interface coupled to a first layer 2 device interface of a second layer 2 and layer 3 network device by the second link, where the first layer 2 switch interface is a backup of the second layer 2 switch interface and the second layer 2 switch interface is a backup of the first layer 2 switch interface;

means for forwarding only Internet Group Management Protocol (IGMP) messages received from hosts on the first set of VLANs and blocking all traffic destined to hosts on the first set of VLANs at the second layer 2 switch interface on the switch when the first link is up;

means for forwarding only IGMP messages received from hosts on the second set of VLANs and blocking all traffic destined to hosts on the second set of VLANs at the first layer 2 switch interface of the switch when the second link is up; and means for enabling the second layer 2 switch interface to forward all traffic received from and accept all traffic destined to the first and second groups of VLANs only if the first link fails.

4. The apparatus of claim 3 further comprising: means for maintaining a multicast tree at the first layer 2 and layer 3 network device for the first layer 2 device interface indicating the identities of hosts on the first and second sets of VLANs that are to receive multicast data and forwarding multicast data for hosts in the first and second sets of VLANs over the first link, where a second layer 2 device interface of the first layer 2 and layer 3 device is coupled to a second layer 2 device interface of the second layer 2 and layer 3 device by a third link; and means for maintaining a multicast tree at the first layer 2 and layer 3 device for its second layer 2 interface indicating the identities of hosts on the first and second sets of VLANs that are to receive multicast data and forwarding multicast data for hosts on the first and second sets of VLANs over the second and third links to the second layer 2 switch interface.

5. An apparatus comprising: a switch having a first layer 2 switch interface configured to forward all traffic received from and accept all traffic destined to hosts on a first set of virtual local area networks (VLANs) when a first link is up and configured to forward only Internet Group Management Protocol (IGMP) messages received from and to block all traffic destined to hosts on a second set of VLANs when a second link is up, with the first layer 2 switch interface adapted to be coupled to a first layer 2 device interface of a first layer 2 and layer 3 network device by the first link, and with the switch having a second layer 2 switch interface configured to forward all traffic received from and accept all traffic destined to hosts on the second set of VLANs when the second link is up and configured to forward only IGMP messages received from and to block all traffic destined to hosts on the first set of VLANs when the first link is up, and with the second layer 2 switch interface adapted to be coupled to a first layer 2 device interface of a second layer 2 and layer 3 network device by the second link, with the first layer 2 switch interface configured as a backup to the second layer 2 switch interface and the second layer 2 switch interface configured as a backup to the first layer 2 switch interface.

6. The apparatus of claim 5 further comprising:
a first layer 2 and layer 3 network device having a first layer 2 device interface coupled to the first layer 2 switch interface of the switch, with the first layer 2 and layer 3 network device adapted to build a multicast tree for its first layer 2 switch interface indicating the identities of hosts on the first and second sets of VLANs that are to receive multicast data and to forward multicast data from its first layer 2 interface for hosts on the first and second sets of VLANs, with the first layer 2 and layer 3 network device having a second layer 2 device interface coupled to receive IGMP messages transmitted from the second layer 2 switch interface of the switch, with the first layer 2 and layer 3 network device adapted to build a multicast tree for its second layer 2 interface for hosts on the first and second sets of VLANs, and to forward multicast data from its second layer 2 interface for hosts on the first and second set of VLANs.

7. The apparatus of claim 6 further comprising:
a second layer 2 and layer 3 network device having a first layer 2 device interface coupled to the second layer 2 switch interface of the switch and having a second layer 2 device interface coupled to second layer 2 device interface of the first layer 2 and layer 3 device, with the second layer 2 and layer 3 device configured to couple ingress and egress traffic between the second layer 2 device interface of the first layer 2 and layer 3 network device and the second layer 2 switch interface of the switch.

8. A method comprising:

forwarding all egress traffic and receiving all ingress traffic at an active layer 2 switch interface of a switch when a first link is up, with the active layer 2 interface coupled to a first layer 2 device interface of a first layer 2 and layer 3 network device b the first link;

forwarding only Internet Group Management Protocol (IGMP) messages and blocking all ingress traffic at a standby layer 2 switch interface on the switch when the first link is up, where the standby layer 2 device interface is a backup of the active layer 2 switch interface, with the standby layer 2 switch interface coupled to a first layer 2 device interface of a second layer 2 and layer 3 network device by a second link;

enabling the standby layer 2 interface of the switch to accept all ingress traffic and forward all egress traffic only if the first layer 2 interface of the switch fails, maintaining a multicast tree at the first layer 2 and layer 3 network device for its first layer 2 device interface indicating the identities of hosts that are to receive multicast data and forwarding multicast data over the first link, where the second layer 2 and layer 3 device is coupled to a second layer 2 device interface of the first layer 2 and layer 3 device by a third link; and maintaining a multicast tree at the first layer 2 and layer 3 device for its second layer 2 interface indicating the identities of hosts that are to receive multicast data and forwarding multicast data over the second and third links to the standby layer 2 switch interface.

9. An apparatus comprising:

a switch having an active layer 2 switch interface configured to forward all egress traffic and accept all ingress traffic when a first link is up and adapted to be coupled to a first layer 2 device interface of a first layer 2 and layer 3 network device by the first link and with the switch having a standby layer 2 switch interface configured as a backup to the active layer 2 switch interface and configured to forward only Internet Group Management Protocol (IGMP) messages and to block all ingress traffic when the first link is up, and with the standby layer 2 switch interface adapted to be coupled to a first layer 2 device interface of a second layer 2 and layer 3 network device, with the standby layer 2 interface configured to forward all egress traffic and accept all ingress traffic only if the first link fails;

a first layer 2 and layer 3 network device having a first layer 2 device interface coupled to the first layer 2 switch interface of the switch, with the first layer 2 and layer 3 network device adapted to build a multicast tree for its first layer 2 switch interface indicating the identities of hosts that are to receive multicast data and to forward multicast data from its first layer 2 interface; and a second layer 2 and layer 3 network device having a first layer 2 device interface coupled to the second layer 2 switch interface of the switch and having a second layer 2 device interface coupled to second layer 2 device interface of the first layer 2 and layer 3 device, with the second layer 2 and layer 3 device configured to couple ingress and egress traffic between the second layer 2 device interface of the first layer 2 and layer 3 network device and the second layer 2 switch interface of the switch, with the first layer 2 and layer 3 network device adapted to build a multicast tree for its second layer 2 interface, and to forward multicast data from its second layer 2 interface.

10. An apparatus comprising:

means for forwarding all egress traffic and receiving all ingress traffic at an active layer 2 switch interface of a switch when a first link is up, with the active layer 2 interface coupled to a first layer 2 device interface of a first layer 2 and layer 3 network device by the first link;

means for forwarding only Internet Group Management Protocol (IGMP) messages and blocking all ingress traffic at a standby layer 2 switch interface on the switch when the first link is up, where the standby layer 2 device interface is a backup of the active layer 2 switch interface, with the standby layer 2 switch interface coupled to a first layer 2 device interface of a second layer 2 and layer 3 network device by a second link;

means for enabling the standby layer 2 interface of the switch to accept all ingress traffic and forward all egress traffic only if the first link fails;

means for maintaining a multicast tree at the first layer 2 and layer 3 network device for its first layer 2 device interface indicating the identities of hosts that are to receive multicast data and forwarding multicast data over the first link, where the second layer 2 and layer 3 device is coupled to a second layer 2 device interface of the first layer 2 and layer 3 network device by a third link; and means for maintaining a multicast tree at the first layer 2 and layer 3 device for its second layer 2 interface indicating the identities of hosts that are to receive multicast data and forwarding multicast data over the second and third links to the standby layer 2 switch interface.

* * * * *